US012755542B2

(12) United States Patent
New et al.

(10) Patent No.: US 12,755,542 B2
(45) Date of Patent: Oct. 6, 2026

(54) ARTIFICIAL INTELLIGENCE ENABLED DISTANCE EVENT DETECTION USING IMAGE ANALYSIS

(71) Applicant: Micron Technology, Inc., Boise, ID (US)

(72) Inventors: Yen-Ee New, Muar (MY); Yih Fen Tan, Ledang (MY)

(73) Assignee: Micron Technology, Inc., Boise, ID (US)

( * ) Notice: Subject to any disclaimer, the term of this patent is extended or adjusted under 35 U.S.C. 154(b) by 342 days.

(21) Appl. No.: 18/494,442

(22) Filed: Oct. 25, 2023

(65) Prior Publication Data

US 2024/0153274 A1 May 9, 2024

Related U.S. Application Data

(60) Provisional application No. 63/382,789, filed on Nov. 8, 2022.

(51) Int. Cl.

| | |
|---|---|
| ***G06V 20/52*** | (2022.01) |
| ***G06T 3/04*** | (2024.01) |
| ***G06T 7/73*** | (2017.01) |
| ***G06V 10/70*** | (2022.01) |

(52) U.S. Cl.
CPC ................ *G06V 20/52* (2022.01); *G06T 3/04* (2024.01); *G06T 7/74* (2017.01); *G06V 10/70* (2022.01); *G06T 2200/24* (2013.01); *G06T 2207/10016* (2013.01); *G06T 2207/20081* (2013.01)

(58) Field of Classification Search
CPC .......... G06V 20/52; G06V 10/70; G06T 3/04; G06T 7/74; G06T 2200/24; G06T 2207/10016; G06T 2207/20081
See application file for complete search history.

(56) References Cited

U.S. PATENT DOCUMENTS

| | | | | |
|---|---|---|---|---|
| 2021/0034865 A1* | 2/2021 | Nord | ..................... | G06F 18/254 |
| 2021/0289264 A1* | 9/2021 | Booth | ................... | G06F 16/735 |
| 2021/0337133 A1* | 10/2021 | Bendtson | ............... | H04N 5/272 |
| 2021/0357649 A1* | 11/2021 | Adam | .................. | G06V 40/171 |
| 2022/0019810 A1* | 1/2022 | Farber | ..................... | G06V 20/52 |
| 2022/0076554 A1* | 3/2022 | Jones, Sr. | .............. | G06V 20/41 |

* cited by examiner

*Primary Examiner* — Amara Abdi
(74) *Attorney, Agent, or Firm* — Harrity & Harrity, LLP

(57) ABSTRACT

In some implementations, an image processing system may obtain, from one or more cameras, a stream of image frames. The image processing system may detect, using an object detection model, one or more objects depicted in one or more image frames included in the stream of image frames. The image processing system may generate one or more modified images, of the one or more image frames, including indications of detected objects depicted in the one or more image frames. The image processing system may calculate distances between one or more pairs of objects detected in the one or more modified images, the distances being calculated using the indications and a uniform view. The image processing system may detect one or more events based on one or more distances satisfying a threshold. The image processing system may provide a user interface for display that indicates the one or more events.

25 Claims, 12 Drawing Sheets

ARTIFICIAL INTELLIGENCE ENABLED DISTANCE EVENT DETECTION USING IMAGE ANALYSIS

CROSS-REFERENCE TO RELATED APPLICATION

This patent application claims priority to U.S. Provisional Patent Application No. 63/382,789, filed on Nov. 8, 2022, and entitled "ARTIFICIAL INTELLIGENCE ENABLED DISTANCE EVENT DETECTION USING IMAGE ANALYSIS." The disclosure of the prior application is considered part of and is incorporated by reference into this patent application.

TECHNICAL FIELD

The present disclosure generally relates to image analysis and object detection and, for example, artificial intelligence enabled distance event detection using image analysis.

BACKGROUND

Object detection is a technology related to computer vision and image processing that is associated with detecting instances of semantic objects of a certain class (such as humans, buildings, or cars) in digital images and/or videos. Object detection algorithms typically leverage machine learning or deep learning to produce meaningful results indicating objects detected in digital images and/or videos. For example, a machine learning model (such as a convolutional neural network) may be trained to automatically detect objects within images and/or videos. The machine learning model may be trained to insert indications (e.g., a bounding box) around a detected object in an image that is input to the machine learning model.

DETAILED DESCRIPTION

Figure 1A:
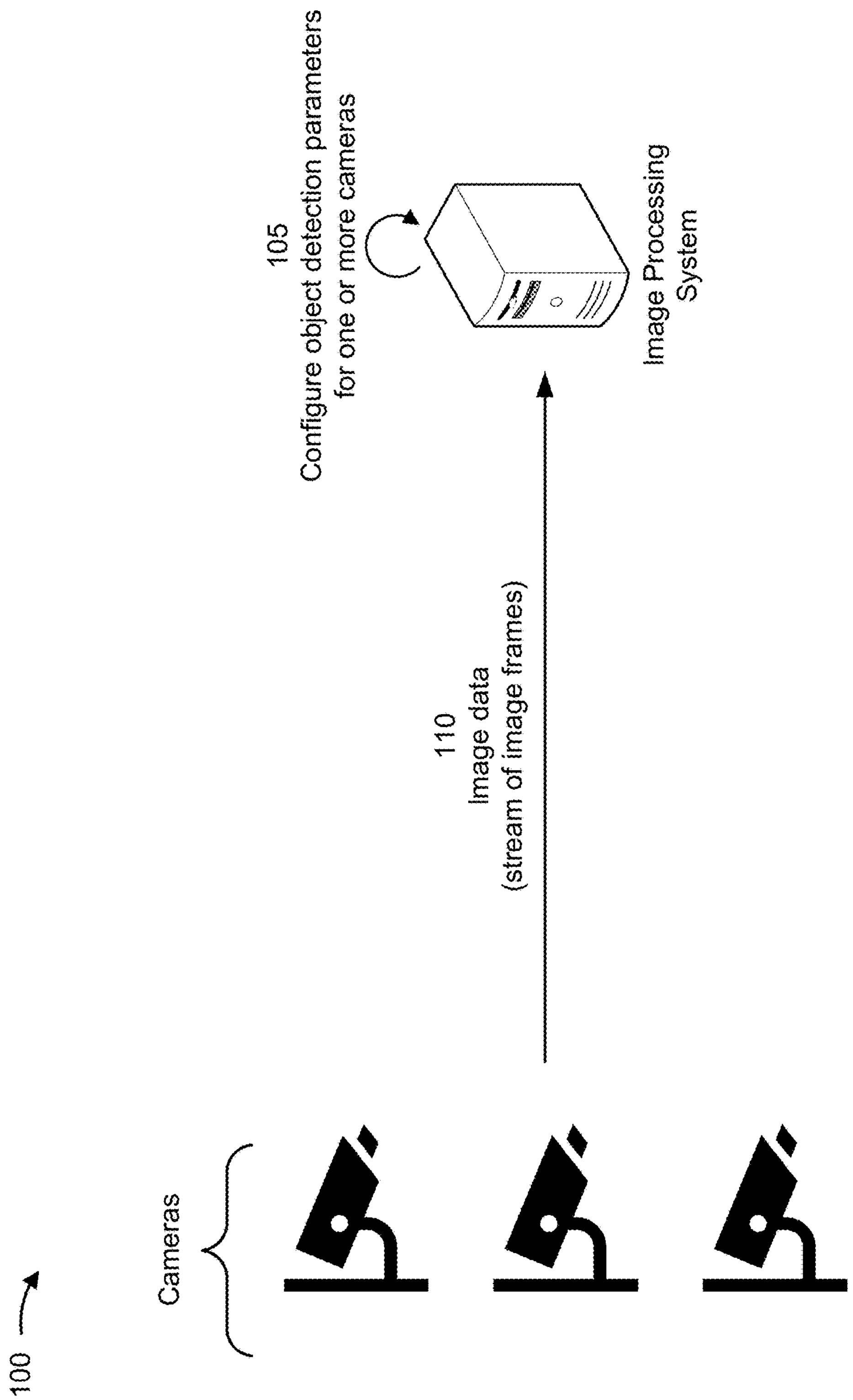
FIGS. 1A-1D are diagrams of an example associated with artificial intelligence enabled distance event detection using image analysis.

In some cases, it may be beneficial to detect and/or determine a distance between two objects. For example, distance determinations between two objects may facilitate collision detection, safe distance determinations (e.g., between a person and a machine or vehicle), and/or social distance monitoring, among other examples. However, the detection and/or determination of the distance between two objects may be difficult using images and/or video feeds capturing the two objects. For example, an object detection model (e.g., an artificial intelligence or machine learning model trained to detect objects in an image or video) may be utilized to automatically detect the two objects in the images and/or video. However, it may be difficult to determine an actual distance between the two objects because the images and/or videos may be captured using different perspectives or views. For example, images and videos may be captured (e.g., by a camera) with different image sizes, from different angles, and/or with different frame sizes, among other examples. As a result, it may be difficult for a system to accurately determine real-world distances between detected objects across images or videos using different configurations. For example, the system may be trained to determine distances for each configuration and/or view of images and/or videos analyzed by the system. However, this may consume significant computing resources, processing resources, and/or memory resources, among other examples.

Additionally, object detection and/or distance determination may be made on a per-camera-feed basis. In other words, the system may analyze images and/or videos captured by different cameras separately. This may consume computing resources, processing resources, and/or memory resources, among other examples, associated with separately performing analyses of images and/or videos captured by multiple cameras associated with the system. Moreover, this may introduce difficulties with scaling and/or increasing the quantity of cameras associated with the system. For example, in such cases, as the quantity of cameras is increased, the associated computing resources, processing resources, and/or memory resources, among other examples, associated with separately performing analyses of images and/or videos captured by the cameras increases. Further, one or more components of the system (such as a graphics processing unit (GPU)) associated with analyzing and/or performing object detection (e.g., one or more components deploying an object detection model) may cause a bottleneck associated with separately performing analyses of images and/or videos as the quantity of cameras associated with the system is increased.

Moreover, the per-camera-feed analysis of object detection and/or distance determinations may provide results for each camera separately. As a result, a user may be required to separately view and/or access object detection and/or distance determinations for each camera separately. This may consume computing resources, processing resources, network resources, and/or memory resources, among other examples, associated with the user navigating to and/or accessing results for each camera separately.

Some implementations described herein enable artificial intelligence enabled distance event detection using image analysis. For example, a system may obtain, from one or more cameras, a stream of image frames. The system may detect, using an object detection model, one or more objects depicted in one or more image frames included in the stream of image frames. The system may generate one or more modified images of the one or more image frames, the one or more modified images including indications of detected objects depicted in the one or more image frames (e.g., the modified images may include a bounding box around each detected object). The system may process the one or more modified images to transform a perspective of the one or more modified images to a uniform view. The system may calculate distances between one or more pairs of objects detected in the one or more modified images, the distances being calculated using the indications and the uniform view. The system may detect one or more events based on one or more distances, from the distances, satisfying a threshold. The system may provide a user interface for display that indicates the one or more events detected based on the stream of image frames.

For example, the system may use the uniform view (e.g., a top-down view or a bird's eye view) to calculate the distance between detected objects in images captured by one or more cameras. This may ensure that a consistent view is used across different cameras that capture images and/or video from different angles, perspectives, and/or locations. The system may calculate a pixel distance between two detected objects using a reference point in the indications (e.g., the bounding boxes) that are inserted by the object detection model. For example, the system may determine a Euclidean distance between the reference points in the bounding boxes (e.g., after transforming the view to the uniform view). The system may convert the pixel distance to an actual (e.g., real-world) distance using a ratio value that is associated with a given camera (e.g., that captured the image or video in which the objects were detected). The system may use the actual distance to detect whether an event has occurred (e.g., to detect if the two objects are too close together).

In some implementations, the user interface provided by the system may include information associated with events, including the one or more events, captured by all cameras included in the one or more cameras. For example, the user interface may include an indication of a frequency of events over time for respective cameras included in the one or more cameras. As a result, a user may quickly locate informational content of interest associated with the events and information indicating locations (e.g., associated with respective cameras) at which events are more frequently occurring. In this way, computing resources and/or network resources may be conserved by reducing an amount of navigation performed by the user. Furthermore, the system described herein makes data easier to access by enhancing a user interface, thereby improving a user experience, and/or enhancing user-friendliness of a device and the user interface, among other examples.

In some implementations, the system described herein may utilize a decoupled cloud-based system architecture. For example, the system may include components that include separate cloud-based computing units (e.g., GPU(s) and/or central processing units (CPUs)) to perform the operations described herein. For example, the system may include an ingestion component associated with a first one or more computing units configured to obtain and/or store image and/or video feeds from a set (e.g., one or more) of cameras. For example, each computing component, from the first one or more computing components, may be associated with a respective camera from the one or more cameras. The system may include an inferencing component that includes a second one or more computing units configured to obtain image frames from the first one or more computing components and provide the image frames to a graphics processing component (e.g., a cloud-based GPU) included in the inferencing component. The graphics processing component may be configured to detect objects included in the image frames (e.g., using the object detection model). In other words, the graphics processing component may be associated with a dedicated CPU configured to feed image frames to the graphics processing component.

The system may include a post-processing component that includes a third one or more computing units configured to obtain image frames that have been modified to include indications (e.g., bounding boxes) of detected images. The third one or more computing units may be configured to compute distances between pairs of detected objects in the image frames. The third one or more computing units may be configured to detect a violation or event based on a computed distance satisfying a threshold. The system may include a monitoring component that includes a fourth one or more computing components configured to obtain information associated with the detected violations and/or events. The fourth one or more computing components may be configured to provide a report and/or the user interface for display (e.g., including indications of violations or events, locations associated with respective violations or events, and/or a frequency of violations or events associated with respective locations).

As a result, the decoupled cloud-based system architecture may improve the scalability of the system. For example, additional cameras may be added to the system without creating a bottleneck because a workload may be balanced across the various components of the system. This may improve an overall performance of the system by ensuring that a single component does not create a bottleneck in the flow of the object detection and/or distance determination analysis performed by the system. Further, the decoupled cloud-based system architecture may not include any edge devices (e.g., a device that controls data flow at the boundary between two networks, such as a router or routing switch). This may conserve time, processing resources, computing resources, and/or network resources that would have otherwise been associated with the setup and maintenance of the edge devices.

FIGS. 1A-1D are diagrams of an example 100 associated with artificial intelligence enabled distance event detection using image analysis. As shown in FIGS. 1A-1D, example 100 includes one or more cameras, an image processing system, and a client device. These devices are described in more detail in connection with FIGS. 5 and 6. For example, the image processing system may utilize a decoupled cloud-based system architecture for improved performance and scalability, as described in more detail in connection with FIGS. 5 and 6.

As shown in FIG. 1A, and by reference number 105, the image processing system may configure one or more object detection parameters for one or more cameras. For example, the image processing system may configure one or more object detection parameters for respective cameras included in the one or more cameras. The image processing system may configure the one or more object detection parameters for the one or more cameras at an initialization stage and/or each time a new camera is added to the one or more cameras.

The objection detection parameters may include a set of transform reference points associated with transforming a view of a given camera to a uniform view. For example, the uniform view may be a top-down view or a bird's eye view. The set of transform reference points may be associated with transforming image frames captured from a view of a given camera to the uniform view. In other words, each camera may be associated with different transform reference points (e.g., that are based on a view of a respective camera). The view of a given camera may refer to an angle and/or position from which the camera captures images and/or video.

For example, the set of transform reference points may be associated with transforming an image from a perspective view to a top-down view. For example, the set of transform reference points may include four points associated with a view of an image captured by a given camera. The transformation may include transforming the image such that the four points form a square. Therefore, the set of transform reference points may be configured such that when the set of transform reference points are transformed into a square, the resulting image captured by a given camera is transformed into a top-down view (e.g., the uniform view). The image processing system may determine the set of transform reference points for each camera included in the one or more cameras. Additionally, or alternatively, the image processing system may receive a user input indicating the set of transform reference points for each camera included in the one or more cameras. The transformation and the set of transform reference points are depicted and described in more detail in connection with FIG. 4.

In some implementations, the one or more object detection parameters may include a ratio value (e.g., a distance ratio) associated with converting a pixel distance to an actual (e.g., real-world) distance. For example, the ratio value may be associated with a ratio between a pixel distance in an image frame captured by a given camera and an actual distance in the real-world. For example, the image processing system may obtain a measurement value indicating a real-world measurement of an object (e.g., a length of an object). For example, the image processing system may obtain actual measurement values of one or more static objects (e.g., objects in the view of the camera that do not move and/or have a known location included in a view of a camera. The image processing system may determine the ratio value for a given camera by determining a quantity of pixels associated with the object (e.g., the length of the object) as depicted in an image captured by the given camera. For example, the image processing system may calculate pixel measurement values of the one or more static objects as depicted in one or more images, from the stream of images, associated with the camera. The ratio value for the given camera may be a ratio between the quantity of pixels and the measurement value. For example, the image processing system may calculate the ratio value based on the actual measurement values and the pixel measurement values.

For example, the image processing system may obtain a first actual measurement value ($A_1$) of an object. The image processing system may determine a pixel length or pixel distance of the object ($P_1$) as depicted in an image captured by a camera. The image processing system may determine a ratio of $A_1/P_1$. For the same camera, the image processing system may obtain a second actual measurement value ($A_2$) of another object. The image processing system may determine a pixel length or pixel distance of the other object ($P_2$) in an image captured by the camera. The image processing system may determine a ratio of $A_2/P_2$. In some implementations, the image processing system may determine multiple ratios corresponding to multiple objects in the manner described above. The image processing system may average the multiple ratios to determine the ratio value for the camera (e.g., to improve an accuracy of the calculation of the ratio value by using measurements of multiple objects). The image processing system may determine ratio values for other cameras in a similar manner. In this way, the image processing system may be enabled to convert pixel distances of objects depicted in image frames to actual (e.g., real-world) distances. The image processing system may store and/or maintain a library indicating ratio values for different cameras associated with the image processing system.

As shown by reference number 110, the image processing system may obtain image data from the one or more cameras. For example, the image data may include one or more image frames. In some implementations, the image processing system may obtain image frames from the one or more cameras. In some implementations, the image processing system may obtain a stream of image frames. For example, the image processing system may obtain a video feed from each camera, where each video feed includes a stream of image frames. In some implementations, the image processing system may store the image frames obtained from the one or more cameras.

Figure 1B:
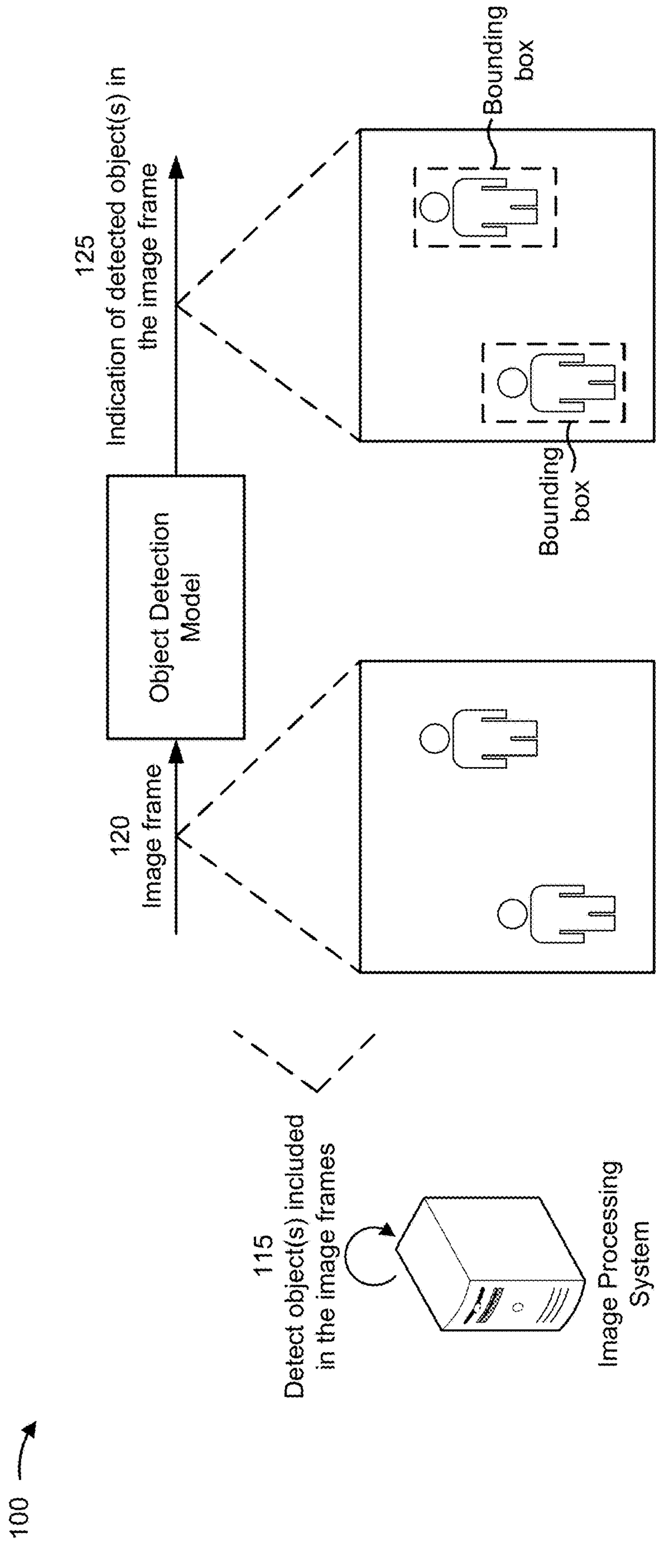

As shown in FIG. 1B, and by reference number 115, the image processing system may detect one or more objects included in (e.g., depicted in) the image frames obtained from the one or more cameras. For example, the image processing system may detect one or more objects depicted in one or more image frames included in the stream of image frames. In some implementations, the image processing system may detect the one or more objects using an object detection model. For example, the object detection model may be an artificial intelligence and/or machine learning model that is trained to detect objects in image frames and/or videos. For example, the object detection model may include a convolutional neural network.

The object detection model may be trained to detect one or more types of objects. For example, the one or more types of objects may include a person, a vehicle, a machine, and/or a device, among other examples. The object detection model may be trained using a training set that includes historical image frames that include indications of a location of a given object depicted in the historical image frames.

In some implementations, the image processing system may perform pre-processing of the image frames prior to inputting the image frames to the object detection model. For example, the pre-processing may include re-sizing an image frame to a uniform size (e.g., a size for all image frames to be input to the object detection model). Additionally, or alternatively, the image processing system may perform a brightness adjustment and/or a contrast tuning of an image frame. For example, the image processing system may increase a brightness, modify the contrast, and/or modify the sharpness of an image frame to improve the quality of the image frame. The pre-processing may improve the accuracy of object detection determinations performed by the object detection model by improving the quality and/or consistency of image frames provided to the object detection model. Additionally, or alternatively, the image processing system may obfuscate certain portions of an image frame. For example, the image processing system may black-out or block certain portions of an image frame to obfuscate sensitive or confidential information. This may improve a security of the sensitive or confidential information because the object detection model may be associated with a third-party (e.g., may be deployed on a third-party server). Therefore, by obfuscating the sensitive or confidential information, the image frames provided to the object detection model may not depict the sensitive or confidential information.

As shown by reference number 120, the image processing system may input an image frame into the object detection model. As shown by reference number 125, the object detection model may output an indication of one or more detected objects included in the image frame. For example, the image processing system may generate, via the object detection model, modified image frames that include an indication of detected objects depicted in the modified image frames. In other words, the image processing system may generate one or more modified images of the one or more image frames, the one or more modified images including indications of detected objects depicted in the one or more image frames.

For example, as shown in FIG. 1B, the indication provided and/or generated by the image processing system (and/or the object detection model) may include a bounding box. A bounding box may be a rectangle that is inserted into an image frame to surround an object detected in the image frame (e.g., to indicate the bounds of the detected object as depicted in the image frame). For example, the bounding box may be a box (e.g., a rectangle) having a smallest size in which all points of the detected object are included. The image processing system may insert a bounding box around each detected object depicted in the image frames to generate the modified image frames.

The image processing system may process other image frames in a similar manner. In some implementations, the image processing system may store modified images (e.g., that include bounding boxes or other indications associated with detected objects) that depict detected objects. In some implementations, the image processing system may store modified images that include two or more detected objects (e.g., for further processing to determine a distance between the two or more detected objects). This may conserve memory resources that would have otherwise been used to store all image frames and/or image frames that depict only a single detected object.

Figure 1C:
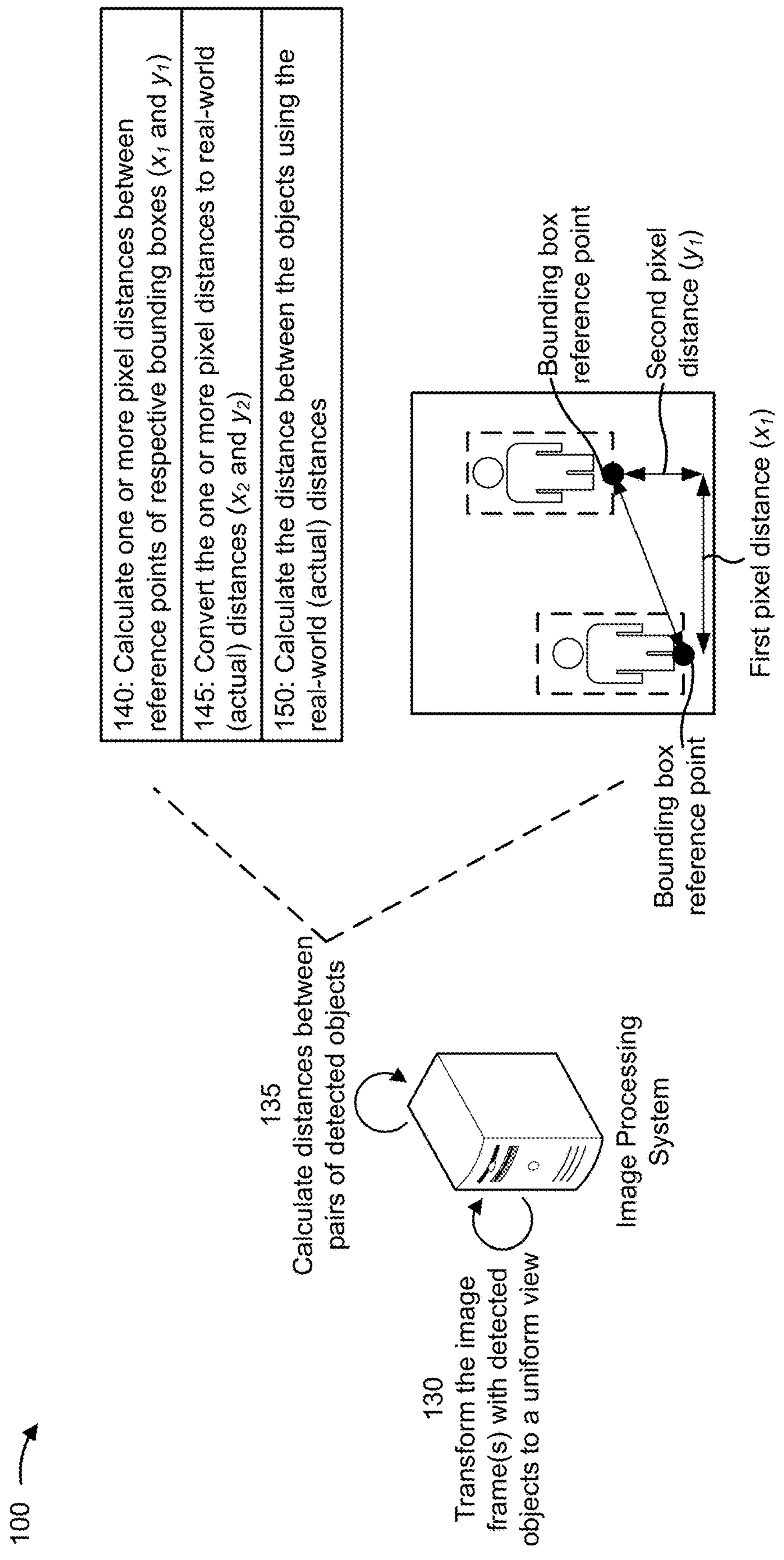

As shown in FIG. 1C, and by reference number 130, the image processing system may transform the image frames with detected objects to a uniform view. For example, the image processing system may process the one or more modified images to transform a perspective of the one or more modified images to the uniform view. In some implementations, the image processing system may process the modified image frames to transform the modified image frames from an angled perspective view to a top-down view. For example, for a given modified image frame, the image processing system may obtain a set of transform reference points (e.g., configured for a camera associated with the given modified image frame). The image processing system may transform the given modified image frame using the set of transform reference points. In other words, the image processing system may perform a perspective transformation on the one or more modified images to transform the image frames to the uniform view. This may ensure that views of image frames captured by different cameras will be processed by the image processing system using the same view (e.g., the uniform view). This reduces complexity and/or improve an accuracy of distance determinations between two or more objects when different cameras with different perspectives and/or configurations are used by the image processing system.

In some implementations, the transformation performed by the image processing system may include a four-point perspective transform and/or a homography transformation. For example, the set of transform reference points for a given camera may define the uniform view (e.g., a top-down view) for the given camera. For example, the image processing system may utilize a transformation matrix, the set of transform reference points, and a size of the image frame to transform the image frame to the uniform view.

As shown by reference number 135, the image processing system may calculate distances between pairs of detected objects in the one or more modified image frames. For example, the image processing system may determine a coordinate location of a reference point of a bounding box associated with a detected object (e.g., shown in FIG. 1C as a bounding box reference point). For example, the reference point may be the bottom center of the bounding box. In some implementations, the image processing system may determine a coordinate location of the reference point using the modified image frame that is in the uniform view. In this way, the image processing system may ensure a uniform and accurate distance determination between detected objects by ensuring that all distance calculations are performed from the perspective of the uniform view (e.g., from a top-down view). This may reduce errors in distance calculations that may be introduced when calculating a distance between objects from a perspective or angled view. In other words, the image processing system may calculate the one or more distances between the two objects based on a distance between respective bounding boxes of the two objects as depicted in a modified image frame (e.g., using the top-down views or uniform views of the modified image frames).

For example, for two objects detected in a given image frame, the image processing system may calculate one or more pixel distances or pixel lengths between reference points of bounding boxes associated with the two objects. For example, as shown by reference number 140, the image processing system may calculate pixel distances between reference points of respective bounding boxes of the two objects as depicted in a modified image frame (e.g., that is transformed to the uniform view). In some implementations, the pixel distance may be a quantity of pixels between a first reference point of a first bounding box and a second reference point of a second bounding box. In other implementations, the image processing system may calculate a vertical pixel distance between a first reference point of a first bounding box and a second reference point of a second bounding box (e.g., $y_1$ as shown in FIG. 1C) and a horizontal pixel distance between the first reference point of the first bounding box and the second reference point of the second bounding box (e.g., $x_1$ as shown in FIG. 1C). As used herein, a pixel distance or a pixel length may refer to a quantity of pixels between two given points depicted in an image frame.

As shown by reference number 145, the image processing system may convert the one or more pixel distances to real-world (e.g., actual) distances. For example, the image processing system may use a ratio value associated with a camera that captured the image frame in which the two objects are depicted to convert the one or more pixel distances to real-world (e.g., actual) distances. For example, the image processing system may modify, using a ratio value (e.g., the distance ratio), the vertical pixel distance to a vertical distance ($y_2$) and the horizontal pixel distance to a horizontal distance ($x_2$). For example, the image processing system may search a library or database that includes ratio values for each camera associated with the image processing system. The image processing system may obtain the ratio value associated with the camera that captured the image frame in which the two objects are depicted. The image processing system may convert the one or more pixel distances to actual distances by multiplying or dividing the pixel distance(s) by the ratio value.

As shown by reference number 150, the image processing system may calculate a distance (e.g., an actual, real-world distance) between the two objects based on the converted distance(s) (e.g., the vertical distance and the horizontal distance). For example, the distance may be a Euclidean distance. For example, the image processing system may calculate the distance as $$z = \sqrt{x_2^2 + y_2^2},$$

where z is the distance between the two objects. The image processing system may calculate distances between two objects in each image frame that includes two or more detected objects in a similar manner.

Figure 1D:
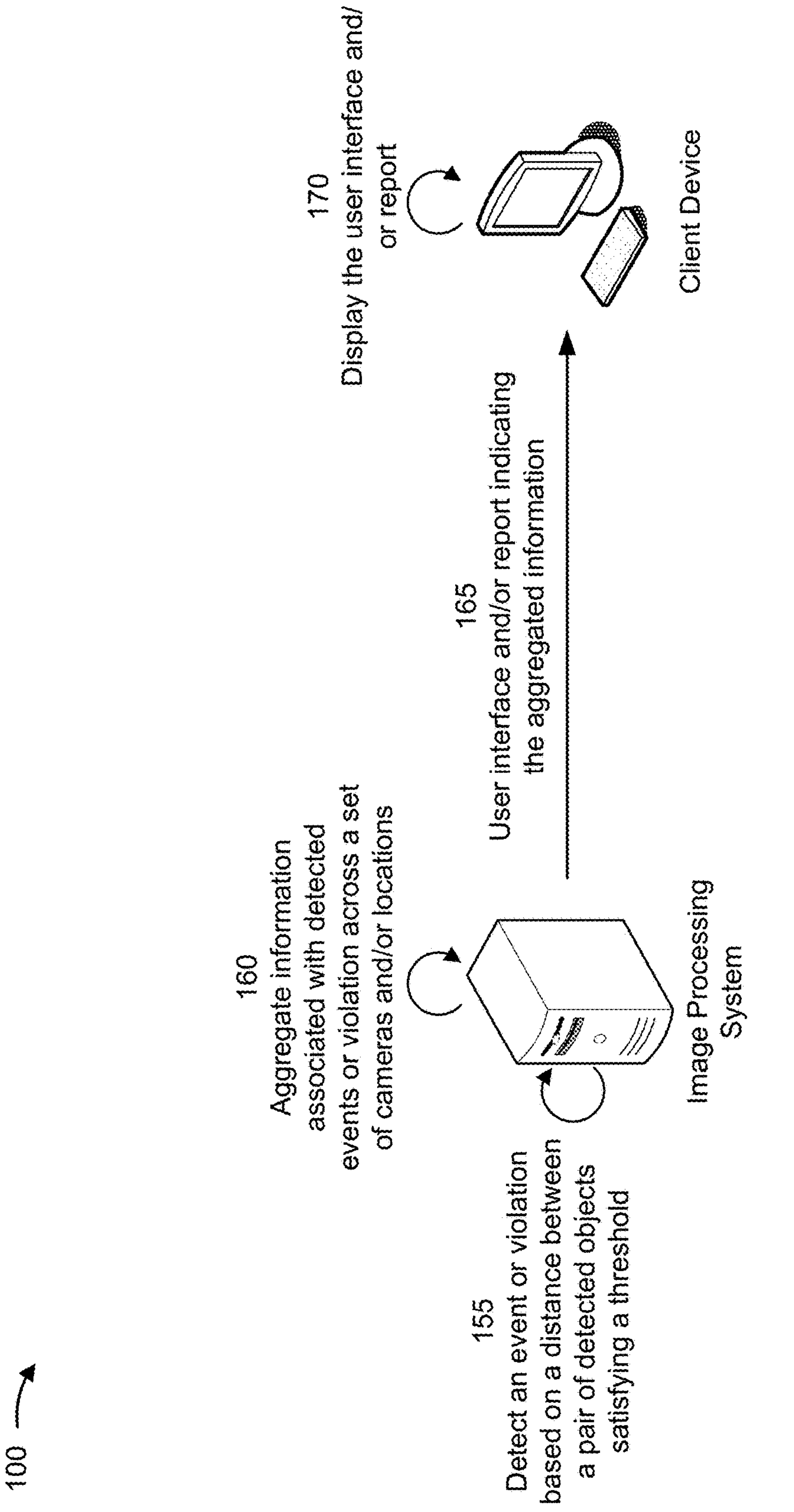

As shown in FIG. 1D, and by reference number 155, the image processing system may detect an event or violation based on a distance between a given pair of detected objects satisfying a threshold. For example, the image processing system may detect one or more events based on one or more distances, from the calculated distances, satisfying a threshold. In some implementations, the threshold may be configured based on a collision detection algorithm, a minimum safe distance between a person and another object, and/or a distance associated with a social distancing requirement, among other examples. For example, the image processing system may calculate a distance between two detected objects in a similar manner as described above. The image processing system may determine whether the distance satisfies the threshold. If the distance satisfies the threshold, then the image processing system may determine that an event or violation has occurred.

In some implementations, the image processing system may detect that an event or violation has occurred based on detecting that a percentage of image frames, from the stream of image frames (e.g., captured by the same camera), over a time window that are associated with detected events. The image processing system may detect that an event or violation has occurred based on detecting that the percentage of the image frames (or a quantity of image frames) satisfies an event threshold or a violation threshold. For example, the cameras may be associated with errors that cause missing image frames in the stream of image frames. Additionally, or alternatively, the object detection model may be associated with an error rate (e.g., associated with inaccurately detecting (or not detecting) objects depicted in an image frame). Therefore, by using a percentage (or quantity) of image frames, over a time window (e.g., a sliding time window), associated with two objects separated by a distance that satisfies the threshold, the image processing system may improve an accuracy of event and/or violation detection. For example, using the percentage (or quantity) of image frames over a sliding time window to detect events or violations may enable the image processing system to filter out incorrect or missed event detections caused by errors with image capturing by a camera and/or errors associated with the object detection model. In some implementations, the time window may be based on a sampling rate or frame rate (e.g., a frames-per-second value) associated with a given camera (or all cameras) associated with the image processing system. For example, if the frame rate is 60 frames per second, then the time window may be one (1) second. However, if the frame rate is 10 frames per second, then the time window may be six (6) seconds (or another duration greater than one second). In other words, if the frame rate is lower, than the time window may have a longer duration (e.g., to ensure that a quantity of frames that are included in each time window are sufficient to filter out noise or errors as described above).

As described elsewhere herein, an event or violation may be associated with a social distancing requirement violation. For example, for public health concerns, a governing body may issue a requirement that people be separated by a certain distance when indoors or in other locations. The threshold (described above) may be, or may be based on, the distance associated with the social distancing requirement. As another example, an event or violation may be associated with an automated guided vehicle (AGV) navigation. For example, the image processing system may detect distances between the AGV and other objects to facilitate an automated navigation of the AGV (e.g., an event or violation may be associated with the AGV being too close to another object). As another example, an event or violation may be associated with a collision detection system. For example, the image processing system may facilitate a predicted collision between the two objects (e.g., based on the distance (s) between the two objects). As another example, an event or violation may be associated with a safety distance between a person and another object (e.g., a vehicle, or an electrostatic discharge (ESD) device). For example, a person that is too close to an ESD device or another device that is sensitive to human contact may cause errors with the functionality of the ESD device or other device. Therefore, the image processing system may detect occurrences of a person being too close to an ESD device. As another example, an event or violation may be associated with measuring or determining distances between objects over time.

In some implementations, the image processing system may store information associated with a detected event based on detecting the event. For example, the information may include an indication of a camera, from the set of cameras, that captured image data used to detect the event, a time associated with the event, a date associated with the event, a location associated with the event, and/or a duration of the event (e.g., based on a quantity of consecutive image frames in which the event or violation is detected), among other examples.

As shown by reference number 160, the image processing system may aggregate or combine information associated with detected events or violations across the set of cameras associated with the image processing system. For example, the image processing system may be configured to collect information associated with detected events or violations across multiple cameras. In some implementations, the image processing system may generate display information for a user interface and/or a report based on the aggregated information. For example, the user interface may include indications of violations or events, locations associated with respective violations or events, and/or a frequency of violations or events associated with respective locations. In some implementations, the user interface may include an indication of violations or events associated with the respective locations over time. Additionally, or alternatively, the user interface may include violations or events detected based on image frames captured by at least two cameras from the one or more cameras. For example, the user interface may include information associated with violations or events captured by all cameras included in the one or more cameras associated with the image processing system. In other words, the user interface and/or report may indicate a trend of overall violations or events and/or a day-to-day trend of violations or events by specific areas or locations. A user interface may also be referred to as a display. Example user interfaces are depicted and described in more detail in connection with FIGS. 2 and 3.

As shown by reference number 165, the image processing system may transmit, and the client device may receive, an indication of the user interface and/or the report (e.g., indicating the aggregated information) for display by the client device. In some implementations, the image processing system may provide the user interface and/or report for display periodically (e.g., once each day). Additionally, or alternatively, the image processing system may provide the user interface and/or report for display based on receiving a request from the client device for the aggregated information. Additionally, or alternatively, the image processing system may provide the user interface and/or report for display based on detecting that a quantity of detected events or violations or a frequency of detected events or violations over a given time frame satisfies a reporting threshold.

As shown by reference number 170, the client device may display the user interface and/or the report. By displaying the aggregated information, a user may be enabled to quickly and easily detect trends associated with detected events or violations across different cameras and/or locations. This may enable the user to initiate one or more actions to mitigate events or violations in one or more areas or locations. This may conserve time, processing resources, network resources, computing resources, and/or memory resources, among other examples, that would have otherwise been used associated with the user navigating to user interfaces or reports associated with each individual camera and/or location, aggregating the information for each individual camera and/or location, and/or determining trends over time for events or violations associated with each individual camera and/or location. Therefore, the report and/or user interface may improve access to data for the user (e.g., by providing the aggregated information in a single user interface) and/or may improve a user experience associated with detecting events or violations captured by multiple cameras and/or in multiple locations or areas.

As indicated above, FIGS. 1A-1D are provided as an example. Other examples may differ from what is described with regard to FIGS. 1A-1D.

Figure 2:
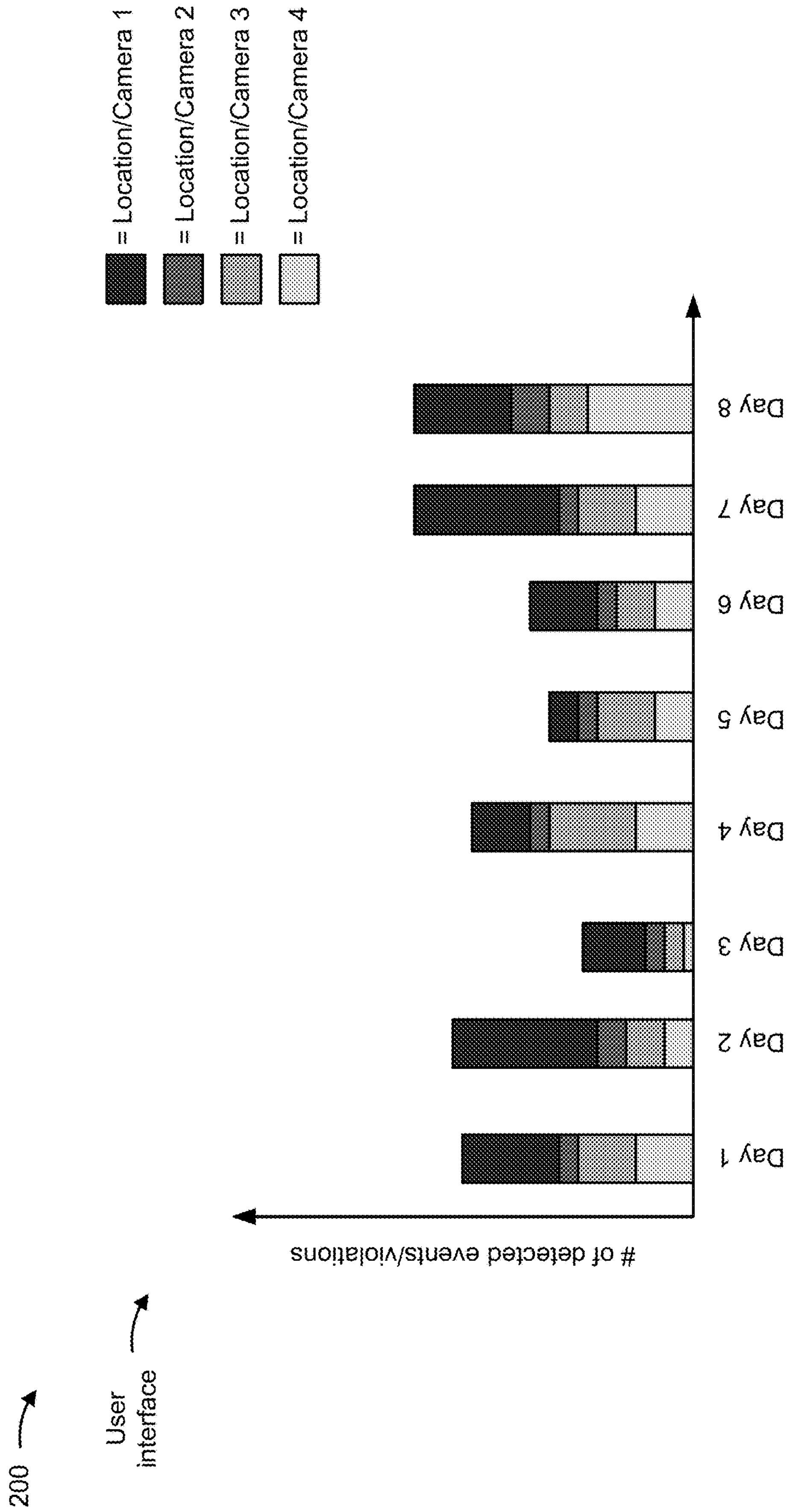
FIG. 2 is a diagram illustrating an example user interface associated with artificial intelligence enabled distance event detection using image analysis.

FIG. 2 is a diagram illustrating an example user interface 200 associated with artificial intelligence enabled distance event detection using image analysis. For example, the user interface 200 may display aggregated information associated with detected events or violations over time (e.g., events or violations detected by the image processing system as described in more detail elsewhere herein).

For example, as shown in FIG. 2, the user interface 200 may be a bar graph. The bar graph is shown as an example and for illustration purposes. Other types of graphs may be used for the user interface 200 in a similar manner. The user interface 200 may include a vertical axis associated with a quantity of detected events and/or violations. In some implementations, the vertical axis may be associated with a duration (e.g., in time) of detected events or violations. The user interface 200 may include a horizontal axis associated with a time scale (e.g., shown in days).

As shown in FIG. 2, the user interface may display aggregated information for multiple locations and/or cameras (e.g., a location/camera 1, a location/camera 2, a location/camera 3, and a location/camera 4). For example, as shown in FIG. 2, a bar for a given day may include an indication of detected events and/or violations for the multiple locations and/or cameras (e.g., in the same bar). This may provide a clear indication of locations associated with more violations or events in a given day. Additionally, by providing an indication of detected events or violations over time, the user interface 200 provides clear indications of trends of events or violations over time (e.g., showing days that are associated with more or fewer total events or violations detected) and at different locations over time (e.g., showing a distribution of events or violations detected at different locations on each day).

As indicated above, FIG. 2 is provided as an example. Other examples may differ from what is described with regard to FIG. 2.

Figure 3:
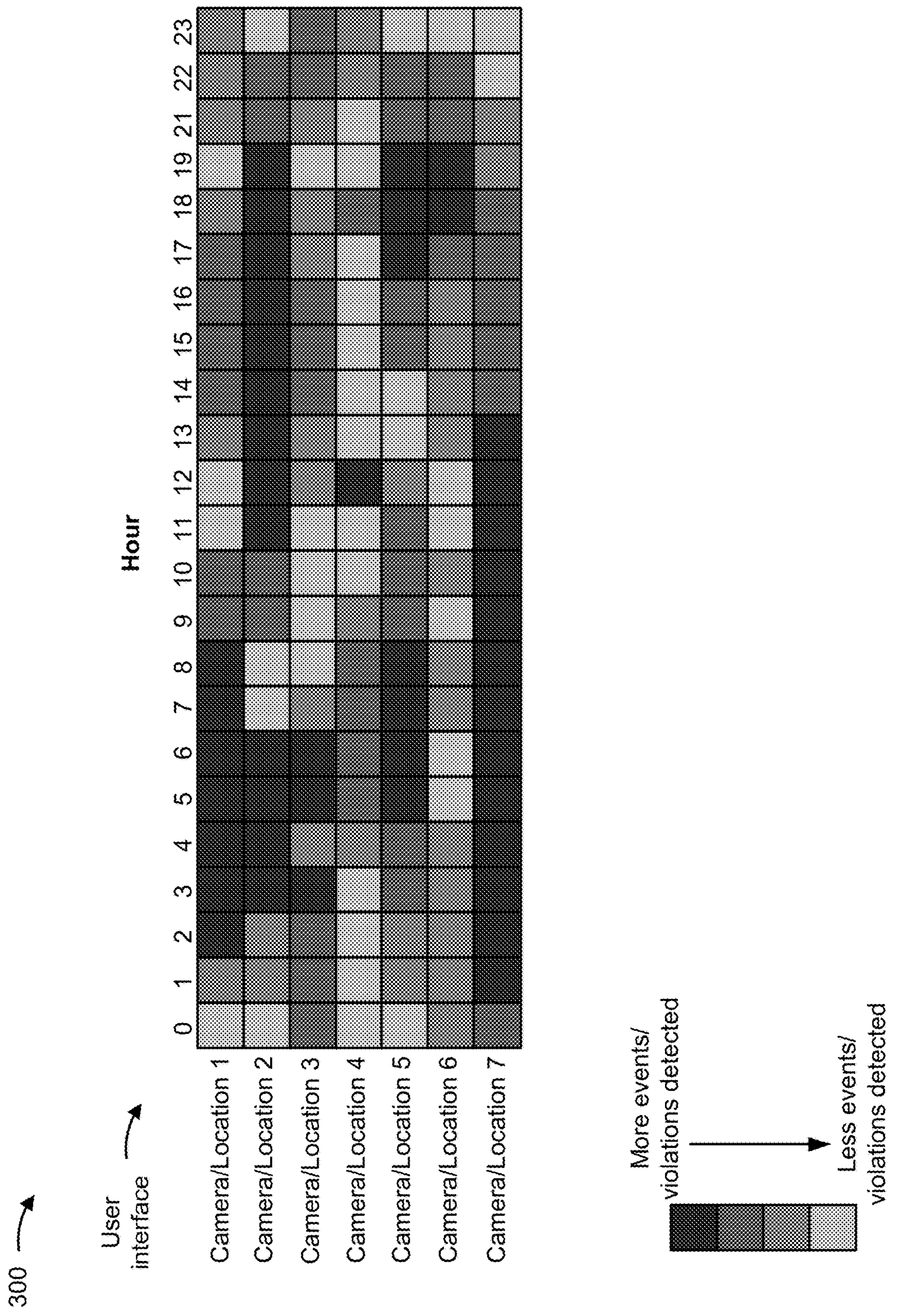
FIG. 3 is a diagram illustrating an example user interface associated with artificial intelligence enabled distance event detection using image analysis.

FIG. 3 is a diagram illustrating an example user interface 300 associated with artificial intelligence enabled distance event detection using image analysis. For example, the user interface 300 may display aggregated information associated with detected events or violations over time (e.g., events or violations detected by the image processing system as described in more detail elsewhere herein).

As shown in FIG. 3, the user interface 300 may include a color scale indicating a frequency of events, including the events, associated with respective cameras and/or respective locations over time. In other words, the user interface 300 may be a heat map indicating a frequency of detected events or violations at respective locations over time. For example, the user interface 300 may include an indication of a frequency of events over time and with respect to locations corresponding to respective cameras from a set of cameras. This may enable a user to quickly identify locations, from multiple locations, where mitigation efforts should be focused. This may conserve time, processing resources, computing resources, network resources, and memory resources that would have otherwise been used separately analyzing results for each camera or location.

For example, as shown in FIG. 3, a vertical axis of the user interface 300 may be associated with different cameras and/or locations and a horizontal axis of the user interface 300 may be associated with a time scale (e.g., hours, in the example user interface 300). In this way, trends of a higher quantity of detected events or violations at a particular location and/or at a particular time can quickly and easily be detected.

As indicated above, FIG. 3 is provided as an example. Other examples may differ from what is described with regard to FIG. 3.

Figure 4:
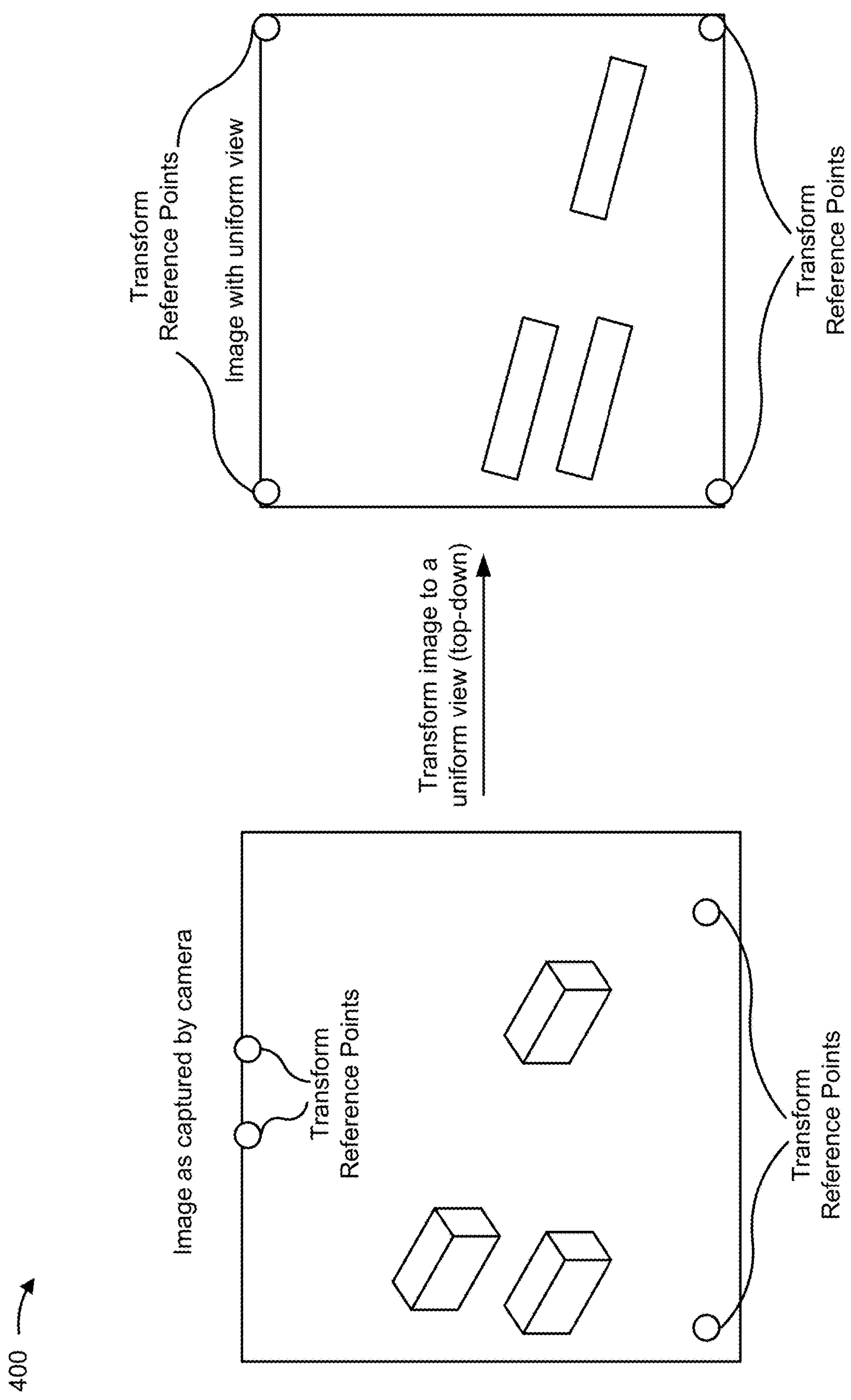
FIG. 4 is a diagram illustrating an example associated with image transformation for artificial intelligence enabled distance event detection using image analysis.

FIG. 4 is a diagram illustrating an example 400 associated with image transformation for artificial intelligence enabled distance event detection using image analysis. For example, FIG. 4 depicts an example perspective transformation for an image frame captured by a camera, as described in more detail elsewhere herein. For example, cameras may capture images and/or video from a perspective (e.g., angled) view. However, to accurately determine distances between objects captured in image frames by the camera, the imaging processing system may transform an image frame into a uniform (e.g., top-down or non-angled) view.

For example, one or more transform reference points may be configured for a camera depending on a physical configuration and/or an angle at which the camera is set up to capture images and/or videos. For example, as shown in FIG. 4, four transform reference points may be configured for a given camera in a field of view of the given camera. The image processing system may obtain an indication of a location of the transform reference points (e.g., via a user input) and/or may determine a location of the transform reference points.

As shown in FIG. 4, the image processing system may transform an image frame using the transform reference points associated with the camera that captured the image frame. For example, the image processing system may use a transform matrix or another technique to modify the image frame such that the transform reference points form a square, a rectangle, or another pre-defined shape (e.g., that is associated with the uniform view). For example, as shown in FIG. 4, the image frame may be transformed from a perspective view to a top-down view. This may enable the image processing system to accurately determine distances between objects captured in the image frame because a coordinate location of the objects can be more accurately determined in the uniform (e.g., top-down) view.

As indicated above, FIG. 4 is provided as an example. Other examples may differ from what is described with regard to FIG. 4.

Figure 5:
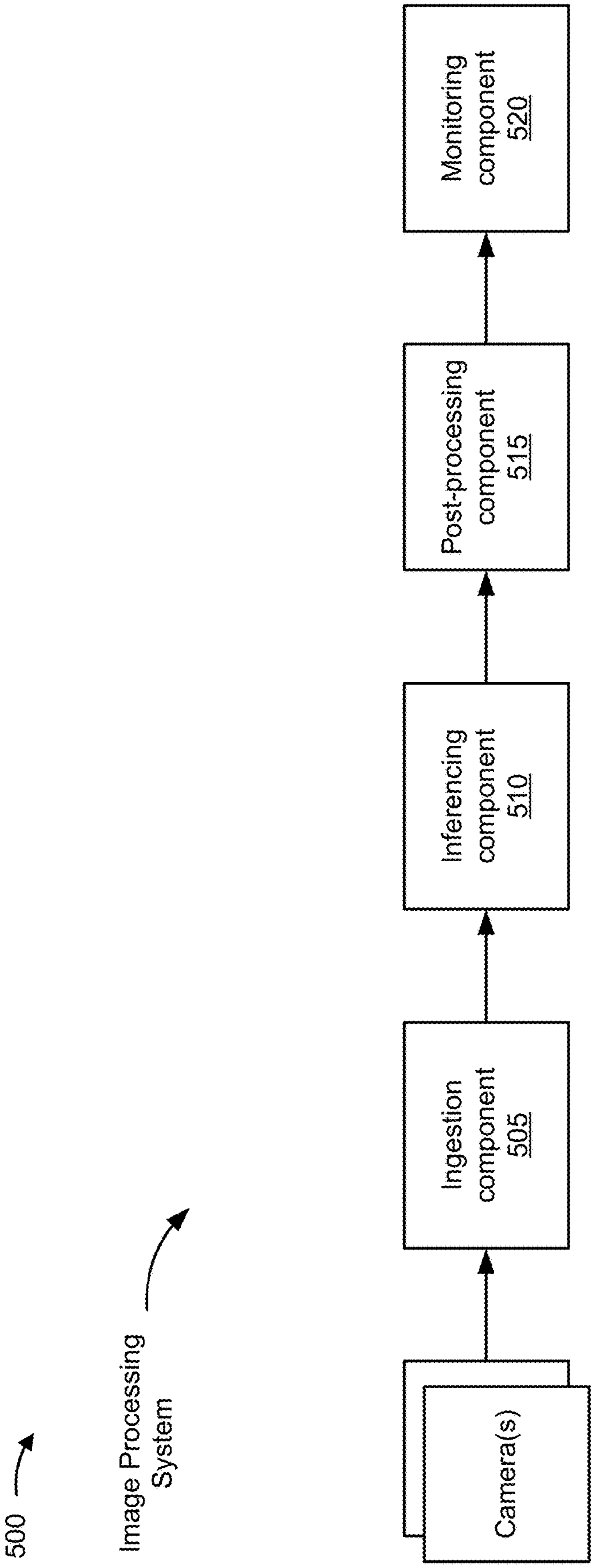
FIG. 5 is a diagram illustrating an example associated with a decoupled cloud-based system architecture for the image processing system.

FIG. 5 is a diagram illustrating an example 500 associated with a decoupled cloud-based system architecture for the image processing system. As shown in FIG. 5, the image processing system may include an ingestion component 505, an inferencing component 510, a post-processing component 515, and a monitoring component 520. Each component of the image processing system may be associated with one or more dedicated cloud-based computing units (e.g., cloud-based CPUs and/or cloud-based GPUs).

The ingestion component 505 may be configured to obtain image frames (e.g., image data and/or a stream of image frames) from one or more (e.g., a set of) cameras. The ingestion component 505 may be configured to store the image frames in one or more storage components. In some implementations, the ingestion component 505 may be configured to perform pre-processing of image frames obtained from the one or more cameras, as described in more detail elsewhere herein. In some aspects, the ingestion component 505 may be configured to obtain, store, and/or pre-process the image frames in real-time as the image frames are generated by the one or more cameras. For example, the ingestion component 505 may be configured to perform operations as described herein, such as in connection with reference numbers 105 and/or 110.

The inferencing component 510 may be configured to obtain the image frames from the one or more storage components (e.g., from the ingestion component 505). The inferencing component 510 may be configured to provide the image frames to a graphics processing component (e.g., a GPU) of the inferencing component 510. The inferencing component 510 may be configured to detect objects in the image frames using an artificial intelligence object detection model. The inferencing component 510 may be configured to provide modified image frames that include an indication of detected objects depicted in the modified image frames (e.g., that include a bounding box around detected objects). Decoupling the inferencing component 510 from other components of the image processing system may ensure that the inferencing component 510 does not experience processing delays associated with performing other tasks (e.g., because object detection may be associated with a higher processing overhead than other tasks performed by the image processing system). For example, the inferencing component 510 may be configured to perform operations as described herein, such as in connection with reference numbers 115, 120, and/or 125.

The post-processing component 515 may obtain the modified image frames generated by the inferencing component 510. In some implementations, the post-processing component 515 may process the modified image frames to transform the modified image frames from an angled perspective view to a uniform view (e.g., a top-down view). The post-processing component 515 may compute, for a modified image frame that includes indications of two or more objects, one or more distances between two objects included in the two or more objects based on respective indications associated with the two objects. The post-processing component 515 may detect a violation based on a distance, from the one or more distances, satisfying a threshold. In some implementations, the post-processing component 515 may store information associated with the violation and image data associated with the violation based on detecting the violation. For example, the post-processing component 515 may be configured to perform operations as described herein, such as in connection with reference numbers 130, 135, 140, 145, 150, and/or 155.

The monitoring component 520 may obtain the information associated with the violation and the image data associated with the violation. The monitoring component 520 may provide a user interface for display that includes indications of violations, including the violation, locations associated with respective violations, and a frequency of violations associated with respective locations. For example, the monitoring component 520 may detect a trigger associated with providing the user interface and/or a report associated with detected violations and/or events. For example, the monitoring component 520 may be configured to perform operations as described herein, such as in connection with reference numbers 160 and/or 165.

The monitoring component 520 may be configured to provide information to a client device, as described in more detail elsewhere herein. The client device may include one or more devices capable of receiving, generating, storing, processing, and/or providing information associated with image transformation for artificial intelligence enabled distance event detection using image analysis, as described elsewhere herein. The client device may include a communication device and/or a computing device. For example, the client device may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The image processing system (e.g., the ingestion component 505, the inferencing component 510, the post-processing component 515, and the monitoring component 520) may be included in a cloud computing environment. For example, the cloud computing environment may include computing hardware, a resource management component, a host operating system (OS), and/or one or more virtual computing systems. The image processing system may execute on, for example, an Amazon Web Services platform, a Microsoft Azure platform, or a Snowflake platform, among other examples. The resource management component may perform virtualization (e.g., abstraction) of computing hardware to create the one or more virtual computing systems (such as the ingestion component 505, the inferencing component 510, the post-processing component 515, and/or the monitoring component 520). Using virtualization, the resource management component enables a single computing device (e.g., a computer or a server) to operate like multiple computing devices, such as by creating multiple isolated virtual computing systems from computing hardware of the single computing device. In this way, computing hardware can operate more efficiently, with lower power consumption, higher reliability, higher availability, higher utilization, greater flexibility, and lower cost than using separate computing devices.

The computing hardware may include hardware and corresponding resources from one or more computing devices. For example, computing hardware may include hardware from a single computing device (e.g., a single server) or from multiple computing devices (e.g., multiple servers), such as multiple computing devices in one or more data centers. For example, computing hardware may include one or more processors, one or more memories, and/or one or more networking components. Examples of a processor, a memory, and a networking component (e.g., a communication component) are described elsewhere herein.

The resource management component may include a virtualization application (e.g., executing on hardware, such as computing hardware) capable of virtualizing computing hardware to start, stop, and/or manage one or more virtual computing systems. For example, the resource management component may include a hypervisor (e.g., a bare-metal or Type 1 hypervisor, a hosted or Type 2 hypervisor, or another type of hypervisor) or a virtual machine monitor, such as when the virtual computing systems are virtual machines. Additionally, or alternatively, the resource management component may include a container manager, such as when the virtual computing systems are containers. In some implementations, the resource management component executes within and/or in coordination with a host operating system.

A virtual computing system may include a virtual environment that enables cloud-based execution of operations and/or processes described herein using computing hardware. A virtual computing system may include a virtual machine, a container, or a hybrid environment that includes a virtual machine and a container, among other examples. A virtual computing system may execute one or more applications using a file system that includes binary files, software libraries, and/or other resources required to execute applications on a guest operating system (e.g., within the virtual computing system) or the host operating system.

Although the image processing system may include one or more elements of a cloud computing system as described above, may execute within the cloud computing system, and/or may be hosted within the cloud computing system, in some implementations, the image processing system may not be cloud-based (e.g., may be implemented outside of a cloud computing system) or may be partially cloud-based. For example, the image processing system may include one or more devices that are not part of the cloud computing system, which may include a standalone server or another type of computing device.

The number and arrangement of devices and components shown in FIG. 5 are provided as an example. In practice, there may be additional devices and/or components, fewer devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of the example 500 may perform one or more functions described as being performed by another set of devices of the example 500.

Figure 6:
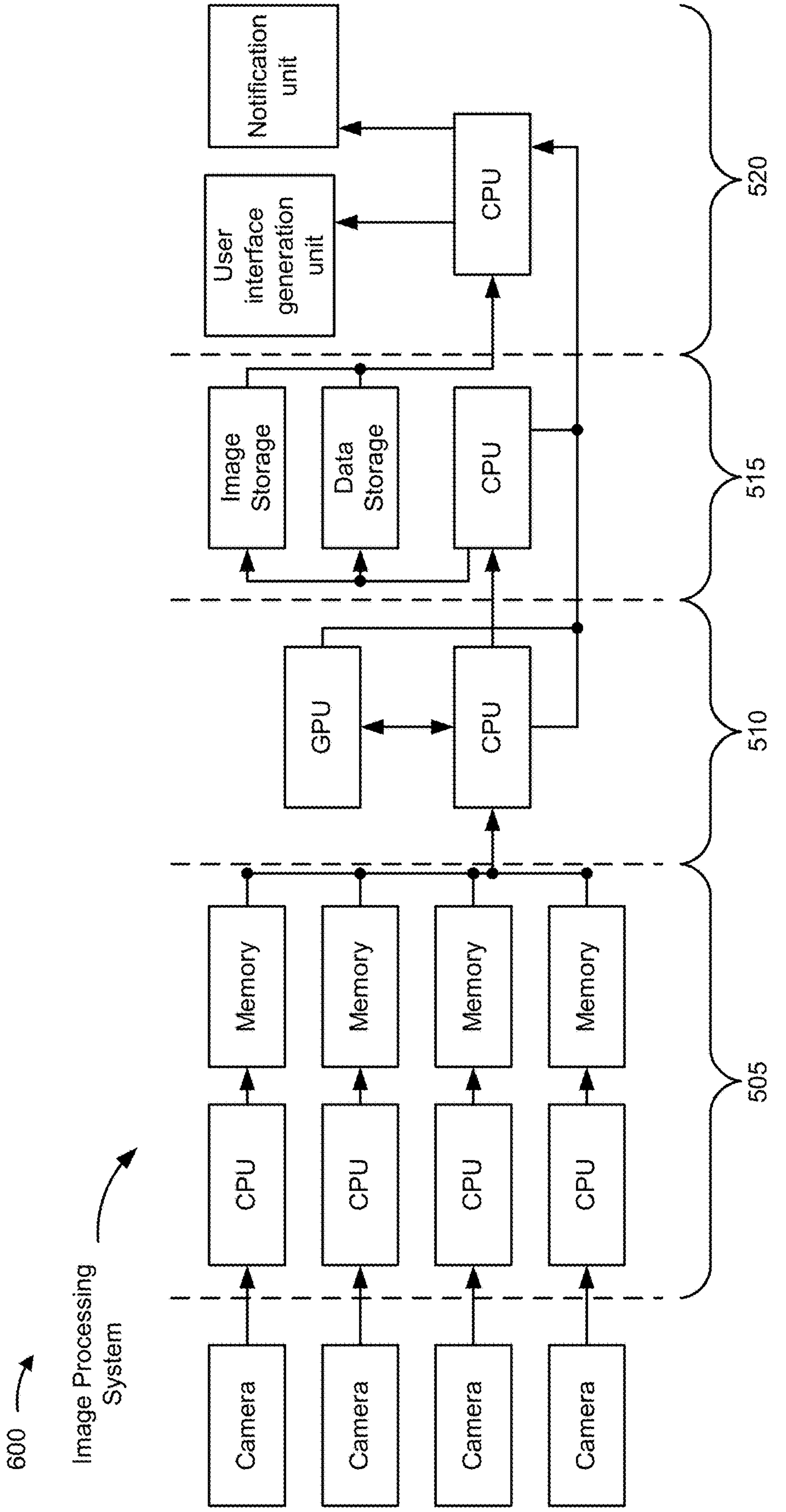
FIG. 6 is a diagram illustrating an example associated with a decoupled cloud-based system architecture for the image processing system.

FIG. 6 is a diagram illustrating an example 600 associated with a decoupled cloud-based system architecture for the image processing system. As shown in FIG. 6, each component of the image processing system (e.g., the ingestion component 505, the inferencing component 510, the post-processing component 515, and/or the monitoring component 520) may include dedicated computing units (e.g., CPUs and/or GPU(s)). The computing units may be cloud-based computing units (e.g., may be virtual computing systems).

For example, as shown in FIG. 6, the ingestion component 505 may include a first one or more computing components (e.g., CPUs). In some implementations, each computing component, from the first one or more computing components, is associated with a respective camera from the one or more cameras. In other words, each camera associated with the image processing system may provide image data (e.g., a stream of image frames) to a dedicated CPU included in the ingestion component 505. This may improve a flexibility of the system and may ensure that the CPUs are enabled to perform real-time processing of the image data as it is obtained from the camera (e.g., because a given CPU may only be responsible for obtaining and/or processing image data from a single camera). Additionally, this may reduce a difficulty associated with scaling the image processing system because as additional cameras are added, a burden or overhead associated with the ingestion component 505 may not increase (e.g., an additional CPU may be added to the ingestion component 505 when a new camera is added to cover the additional processing requirements of the new camera). The CPUs may store image data (e.g., pre-processed image data) in memory (e.g., a disk and/or a memory or storage component).

As shown in FIG. 6, the inferencing component 510 may include one or more CPUs dedicated to serving a GPU. For example, the one or more CPUs may be configured to obtain image data (e.g., from the memory or storage component of the ingestion component 505) and provide the image data to the GPU for object detection processing. This may improve performance of the GPU because the one or more CPUs dedicated to serving the GPU may ensure that image data is continually provided to the GPU to maximize the processing performed by the GPU. In other words, because the processing performed by the GPU (e.g., the object detection processing) is decoupled from image data retrieval (e.g., performed by the ingestion component 505) and/or post-processing of the image data (e.g., performed by the post-processing component 515), the GPU may not experience delays or downtime associated with performing the image data retrieval and/or the post-processing of the image data. This may improve efficiency and/or utilization of the GPU's computing resources.

The post-processing component 515 may include one or more CPUs configured to perform post-processing logic and/or computation of results based on the object detection performed by the inferencing component 510, as described in more detail elsewhere herein. For example, the one or more CPUs may write results to image storage and/or data storage. The one or more CPUs may remove original image data from the memory or storage component of the ingestion component 505 (e.g., after post-processing is performed) to free memory resources for the ingestion component 505. For example, the one or more CPUs may store the original image data in the image storage.

The monitoring component 520 may include one or more CPUs configured to automatically generate analytic reports and/or user interfaces and to deliver the reports and/or user interfaces to a client device. For example, the one or more CPUs, a user interface generation unit, and/or a notification unit may be configured to generate the reports and/or user interfaces based on aggregated information of detected violations and/or events. The one or more CPUs, the user interface generation unit, and/or the notification unit may be configured to provide the reports and/or user interfaces as configured (e.g., by a client device). In some implementations, the one or more CPUs, the user interface generation unit, and/or the notification unit may be configured to monitor available memory resources and/or processing utilization of the ingestion component 505, the inferencing component 510, and the post-processing component 515. The one or more CPUs, the user interface generation unit, and/or the notification unit may be configured to notify a client device if load balancing operations are to be performed based on the available memory resources and/or processing utilization of the ingestion component 505, the inferencing component 510, and the post-processing component 515.

As indicated above, FIG. 6 is provided as an example. Other examples may differ from what is described with regard to FIG. 6.

Figure 7:
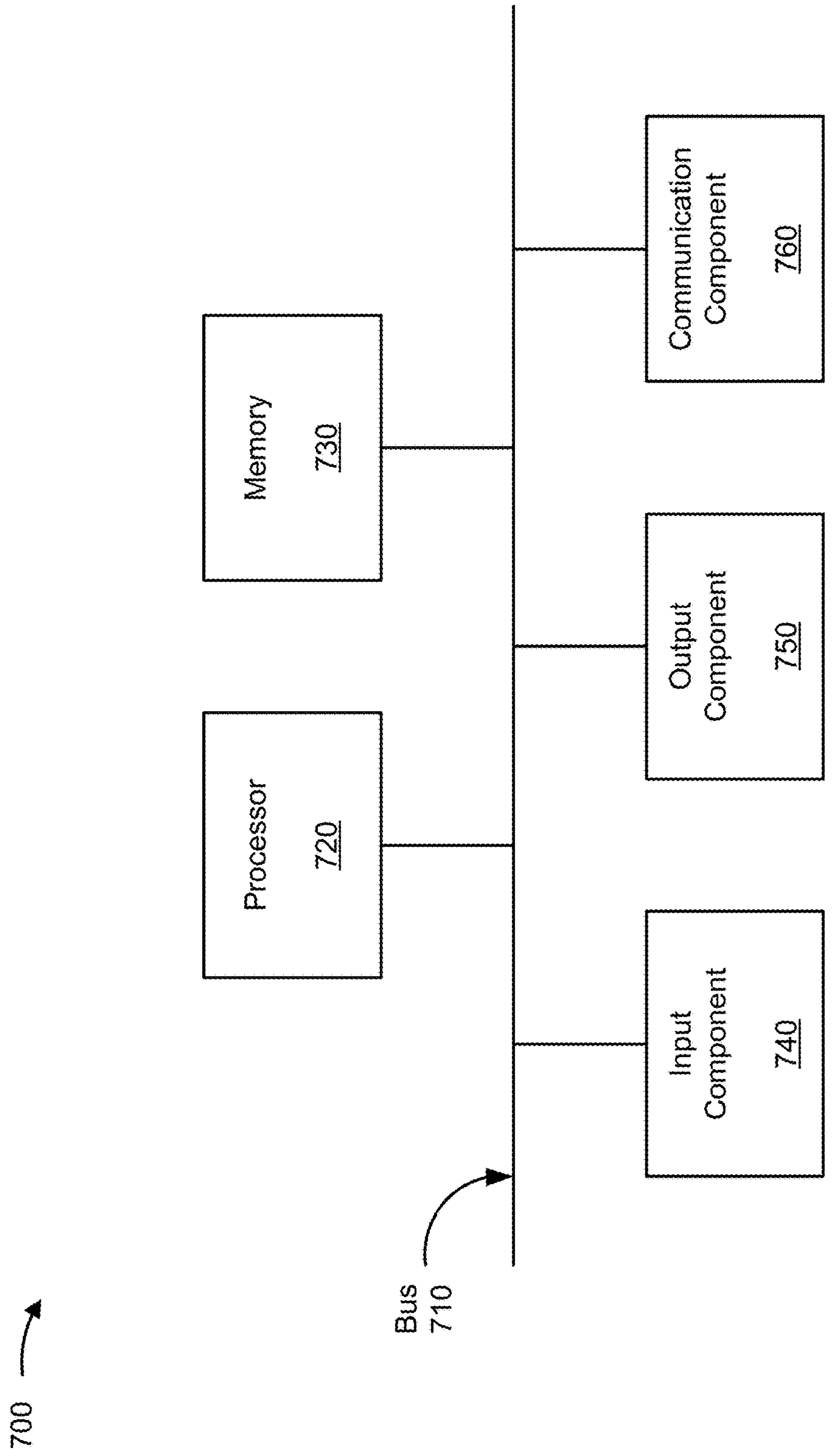
FIG. 7 is a diagram of example components of a device associated with artificial intelligence enabled distance event detection using image analysis.

FIG. 7 is a diagram of example components of a device 700 associated with artificial intelligence enabled distance event detection using image analysis. The device 700 may correspond to the image processing system, the client device, a camera, the ingestion component 505, the inferencing component 510, the post-processing component 515, the monitoring component 520, a CPU, and/or a GPU. In some implementations, the image processing system, the client device, a camera, the ingestion component 505, the inferencing component 510, the post-processing component 515, the monitoring component 520, a CPU, and/or a GPU may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hard-wired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
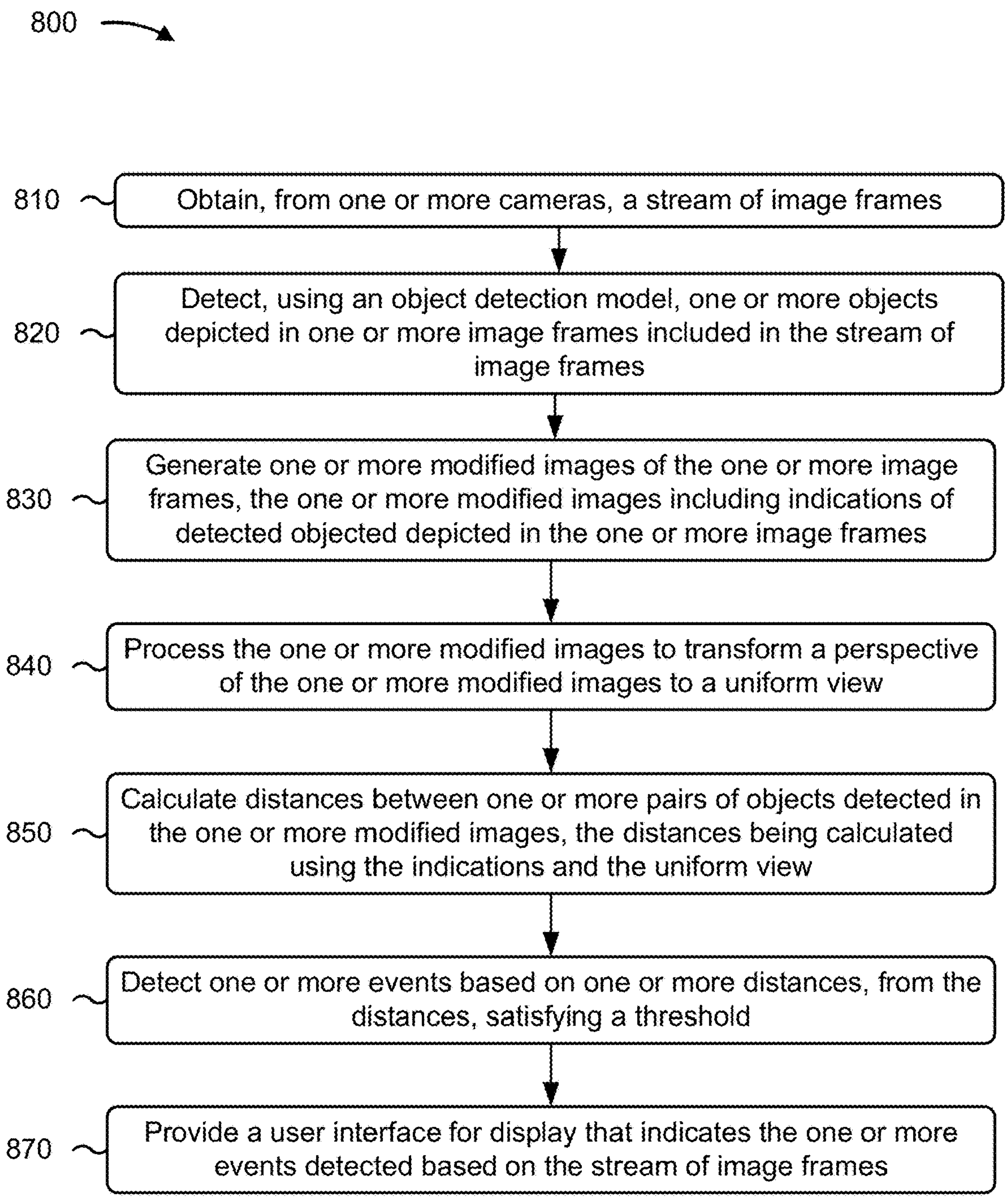
FIG. 8 is a flowchart of an example method associated with artificial intelligence enabled distance event detection using image analysis.

FIG. 8 is a flowchart of an example method 800 associated with artificial intelligence enabled distance event detection using image analysis. In some implementations, an image processing system (e.g., the image processing system described elsewhere herein) may perform or may be configured to perform the method 800. In some implementations, another device or a group of devices separate from or including the image processing system (e.g., a camera and/or a client device) may perform or may be configured to perform the method 800. Additionally, or alternatively, one or more components of the image processing system (e.g., the ingestion component 505, the inferencing component 510, the post-processing component 515, the monitoring component 520, the processor 720, the memory 730, the input component 740, the output component 750, and/or the communication component 760) may perform or may be configured to perform the method 800. Thus, means for performing the method 800 may include the image processing system and/or one or more components of the image processing system. Additionally, or alternatively, a non-transitory computer-readable medium may store one or more instructions that, when executed by the image processing system, cause the image processing system to perform the method 800.

As shown in FIG. 8, the method 800 may include obtaining, from one or more cameras, a stream of image frames (block 810). As further shown in FIG. 8, the method 800 may include detecting, using an object detection model, one or more objects depicted in one or more image frames included in the stream of image frames (block 820). As further shown in FIG. 8, the method 800 may include generating one or more modified images of the one or more image frames, the one or more modified images including indications of detected objects depicted in the one or more image frames (block 830). As further shown in FIG. 8, the method 800 may include processing the one or more modified images to transform a perspective of the one or more modified images to a uniform view (block 840). As further shown in FIG. 8, the method 800 may include calculating distances between one or more pairs of objects detected in the one or more modified images, the distances being calculated using the indications and the uniform view (block 850). As further shown in FIG. 8, the method 800 may include detecting one or more events based on one or more distances, from the distances, satisfying a threshold (block 860). As further shown in FIG. 8, the method 800 may include providing a user interface for display that indicates the one or more events detected based on the stream of image frames (block 870).

The method 800 may include additional aspects, such as any single aspect or any combination of aspects described below and/or described in connection with one or more other methods or operations described elsewhere herein.

In a first aspect, the image processing system is associated with a decoupled cloud-based system architecture.

In a second aspect, alone or in combination with the first aspect, detecting the one or more events comprises detecting a percentage of image frames, from the stream of image frames, over a time window that are associated with detected events, and detecting an event based on the percentage of the image frames satisfying an event threshold.

In a third aspect, alone or in combination with one or more of the first and second aspects, processing the one or more modified images comprises obtaining, for a view of a camera of the one or more cameras, a set of transform reference points associated with transforming the view to the uniform view, and transforming modified images, from the one or more modified images, that are associated with the camera to the uniform view using the set of transform reference points.

In a fourth aspect, alone or in combination with one or more of the first through third aspects, the uniform view is a top-down view.

In a fifth aspect, alone or in combination with one or more of the first through fourth aspects, calculating the distances between the one or more pairs of objects comprises calculating, for a pair of objects from the one or more pairs of objects, a first pixel distance between a first indication of a first object depicted in a modified image and a second indication of a second object depicted in the modified image, calculating a second pixel distance between the first indication and the second indication, modifying, using a ratio value, the first pixel distance to a first actual distance and the second pixel distance to a second actual distance, and calculating a distance between the first object and the second object based on the first actual distance and the second actual distance.

In a sixth aspect, alone or in combination with one or more of the first through fifth aspects, the first indication is a first bounding box indicating a first location of the first object as depicted in the modified image and the second indication is a second bounding box indicating a second location of the second object as depicted in the modified image.

In a seventh aspect, alone or in combination with one or more of the first through sixth aspects, the method 800 includes obtaining actual measurement values of one or more static objects included in a view of a camera associated with the modified image, calculating pixel measurement values of the one or more static objects as depicted in one or more images, from the stream of images, associated with the camera, and calculating the ratio value based on the actual measurement values and the pixel measurement values.

In an eighth aspect, alone or in combination with one or more of the first through seventh aspects, the one or more objects include at least one of a person, a vehicle, a machine, or a device.

In a ninth aspect, alone or in combination with one or more of the first through eighth aspects, the user interface includes information associated with events, including the one or more events, captured by all cameras included in the one or more cameras, and the user interface includes an indication of a frequency of events over time for respective cameras included in the one or more cameras.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

Figure 9:
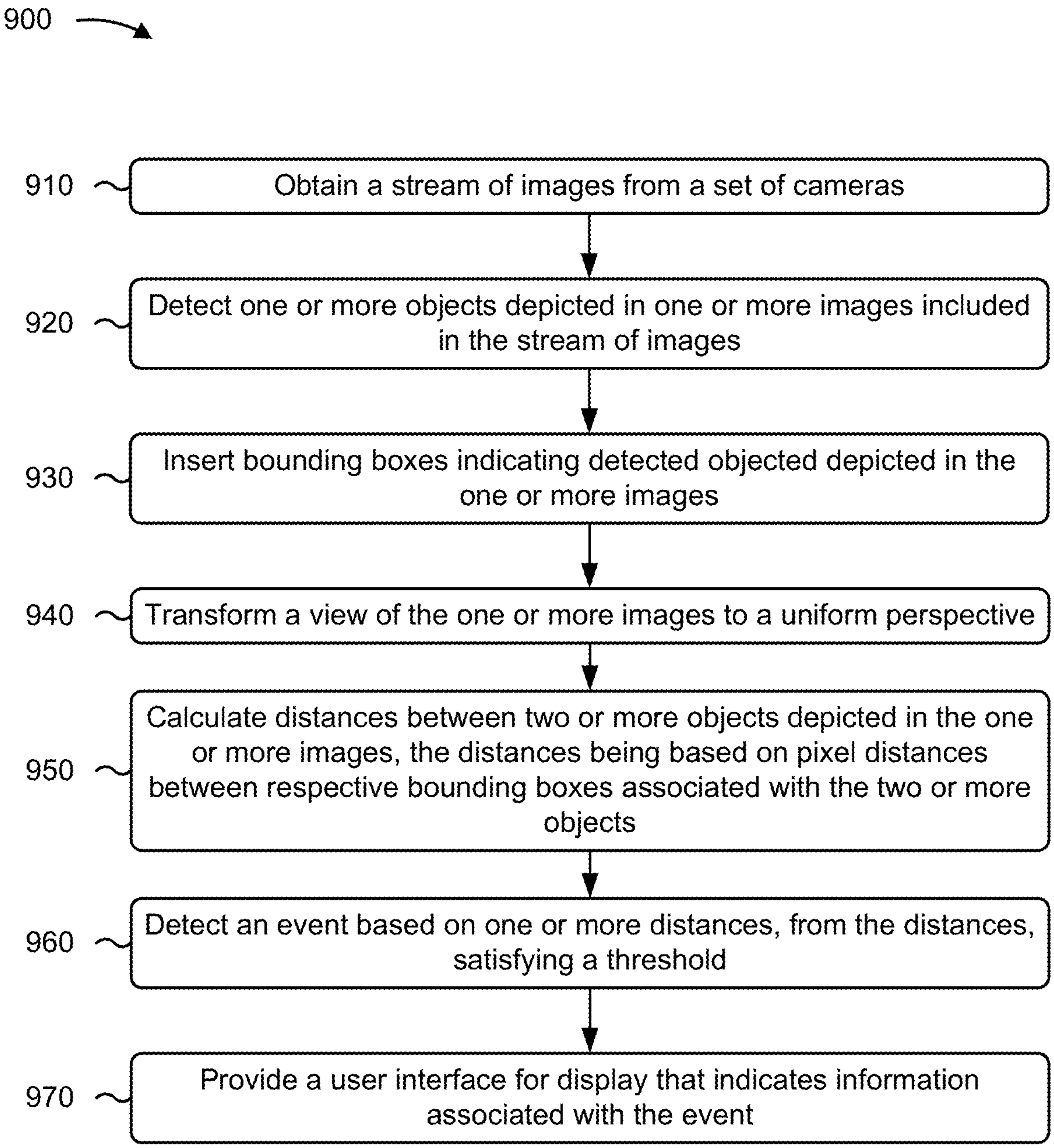
FIG. 9 is a flowchart of an example method associated with artificial intelligence enabled distance event detection using image analysis.

FIG. 9 is a flowchart of an example method 900 associated with artificial intelligence enabled distance event detection using image analysis. In some implementations, an image processing system (e.g., the image processing system described elsewhere herein) may perform or may be configured to perform the method 900. In some implementations, another device or a group of devices separate from or including the image processing system (e.g., a camera and/or the client device) may perform or may be configured to perform the method 900. Additionally, or alternatively, one or more components of the image processing system (e.g., the ingestion component 505, the inferencing component 510, the post-processing component 515, the monitoring component 520, the processor 720, the memory 730, the input component 740, the output component 750, and/or the communication component 760) may perform or may be configured to perform the method 900. Thus, means for performing the method 900 may include the image processing system and/or one or more components of the image processing system. Additionally, or alternatively, a non-transitory computer-readable medium may store one or more instructions that, when executed by the image processing system, cause the image processing system to perform the method 900.

As shown in FIG. 9, the method 900 may include obtaining a stream of images from a set of cameras (block 910). As further shown in FIG. 9, the method 900 may include detecting one or more objects depicted in one or more images included in the stream of images (block 920). As further shown in FIG. 9, the method 900 may include inserting bounding boxes indicating detected objects depicted in the one or more images (block 930). As further shown in FIG. 9, the method 900 may include transforming a view of the one or more images to a uniform perspective (block 940). As further shown in FIG. 9, the method 900 may include calculating distances between two or more objects depicted in the one or more images, the distances being based on pixel distances between respective bounding boxes associated with the two or more objects (block 950). As further shown in FIG. 9, the method 900 may include detecting an event based on one or more distances, from the distances, satisfying a threshold (block 960). As further shown in FIG. 9, the method 900 may include providing a user interface for display that indicates information associated with the event (block 970).

The method 900 may include additional aspects, such as any single aspect or any combination of aspects described below and/or described in connection with one or more other methods or operations described elsewhere herein.

In a first aspect, the method 900 includes providing a report indicating the information associated with the event, wherein the information includes at least one of an indication of a camera, from the set of cameras, that captured image data used to detect the event, a time associated with the event, a date associated with the event, a location associated with the event, or a duration of the event.

In a second aspect, alone or in combination with the first aspect, calculating the distances between two or more objects depicted in the one or more images comprises converting the pixel distances between the respective bounding boxes associated with the two or more objects using a ratio value that is based on a measurement of a reference object included in the one or more images.

In a third aspect, alone or in combination with one or more of the first and second aspects, the user interface includes a color scale indicating a frequency of events, including the events, associated with respective cameras, from the set of cameras, over time.

In a fourth aspect, alone or in combination with one or more of the first through third aspects, the user interface includes an indication of a frequency of events, including the event, over time and with respect to locations corresponding to respective cameras from the set of cameras.

In a fifth aspect, alone or in combination with one or more of the first through fourth aspects, detecting the one or more objects may include using an artificial intelligence object detection model.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

In some implementations, a system includes an ingestion component including: one or more cameras configured to capture image frames; and a first one or more computing components configured to: obtain image frames from the one or more cameras, wherein each computing component, from the first one or more computing components, is associated with a respective camera from the one or more cameras; an inferencing component including: a second one or more computing components configured to: obtain the image frames from the ingestion component; and provide the image frames to a graphics processing component; and the graphics processing component configured to: detect objects in the image frames using an artificial intelligence object detection model; and provide modified image frames that include an indication of detected objects depicted in the modified image frames; a post-processing component including: a third one or more computing components configured to: obtain the modified image frames; compute, for a modified image frame that includes indications of two or more objects, one or more distances between two objects included in the two or more objects based on respective indications associated with the two objects; and detect a violation based on a distance, from the one or more distances, satisfying a threshold.

In some implementations, a method includes obtaining, by an image processing system and from one or more cameras, a stream of image frames; detecting, by the image processing system and using an object detection model, one or more objects depicted in one or more image frames included in the stream of image frames; generating, by the image processing system, one or more modified images of the one or more image frames, the one or more modified images including indications of detected objects depicted in the one or more image frames; processing, by the image processing system, the one or more modified images to transform a perspective of the one or more modified images to a uniform view; calculating, by the image processing system, distances between one or more pairs of objects detected in the one or more modified images, the distances being calculated using the indications and the uniform view; detecting, by the image processing system, one or more events based on one or more distances, from the distances, satisfying a threshold; and providing, by the image processing system, a user interface for display that indicates the one or more events detected based on the stream of image frames.

In some implementations, an apparatus includes means for obtaining a stream of images from a set of cameras; means for detecting one or more objects depicted in one or more images included in the stream of images; means for inserting bounding boxes indicating detected objects depicted in the one or more images; means for transforming a view of the one or more images to a uniform perspective; means for calculating distances between two or more objects depicted in the one or more images, the distances being based on pixel distances between respective bounding boxes associated with the two or more objects; means for detecting an event based on one or more distances, from the distances, satisfying a threshold; and means for providing a user interface for display that indicates information associated with the event.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of:

a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:

an ingestion component including:

one or more cameras configured to capture image frames; and a first one or more computing components configured to:

obtain image frames from the one or more cameras, wherein each computing component, from the first one or more computing components, is associated with a respective camera from the one or more cameras;

an inferencing component including:

a second one or more computing components configured to:

obtain the image frames from the ingestion component; and provide the image frames to a graphics processing component for object detection processing; and the graphics processing component comprising a graphics processing unit (GPU) separate from the one or more second computing components, the graphics processing component configured to:

detect objects in the image frames using an artificial intelligence object detection model; and provide modified image frames that include an indication of detected objects depicted in the modified image frames;

a post-processing component including:

a third one or more computing components configured to:

obtain the modified image frames;

compute, for a modified image frame that includes indications of two or more objects, a vertical pixel distance between a first reference point of a first bounding box associated with a first object, of the two or more objects, and a second reference point of a second bounding box associated with a second object of the two or more objects;

compute a horizontal pixel distance between the first reference point and the second reference point;

modify, using a distance ratio, the vertical pixel distance to a vertical distance and the horizontal pixel distance to a horizontal distance;

compute one or more distances based on the vertical distance and the horizontal distance; and detect a violation based on a distance, from the one or more distances, satisfying a threshold.

2. The system of claim 1, further comprising:

a monitoring component including:

a fourth one or more computing components configured to:

obtain, from the post-processing component, information associated with the violation and image data associated with the violation; and provide a user interface for display that includes indications of violations, including the violation, locations associated with respective violations, and a frequency of violations associated with respective locations.

3. The system of claim 2, wherein the user interface includes an indication of violations associated with the respective locations over time, and wherein the user interface includes violations detected based on image frames captured by at least two cameras from the one or more cameras.

4. The system of claim 1, wherein the third one or more computing components are further configured to:

process the modified image frames to transform the modified image frames from an angled perspective view to a top-down view, and wherein the third one or more computing components, to compute the one or more distances, are configured to:

compute the one or more distances using the top-down views of the modified image frames.

5. The system of claim 1, wherein the indication of detected objects includes bounding boxes, and wherein the graphics processing component, to provide the modified image frames, is configured to:

insert a bounding box around each detected object depicted in the image frames to generate the modified image frames.

6. The system of claim 5, wherein the third one or more computing components, to compute the one or more distances, are configured to:

compute the one or more distances between the two or more objects based on a distance between respective bounding boxes of the two or more objects as depicted in the modified image frame.

7. The system of claim 1, wherein information associated with the violation includes at least one of:

an indication of a camera, from the one or more cameras, that captured image data used to detect the violation, a time associated with the violation, a date associated with the violation, a location associated with the violation, or a duration of the violation.

8. The system of claim 1, wherein the third one or more computing components, to detect the violation, are configured to:

determine a quantity of modified image frames, over a time window, that are associated with distances, from the one or more distances, that satisfy the threshold; and detect the violation based on the quantity satisfying a violation threshold.

9. A method, comprising:

obtaining, by an image processing system and from one or more cameras, a stream of image frames;

obtaining, by an inferencing component of the image processing system, one or more image frames included in the stream of image frames, wherein the inferencing component comprising one or more computing components;

detecting, by a graphics processing component of the image processing system and using an object detection model, one or more objects depicted in the one or more image frames, wherein the graphics processing unit comprises a graphics processing unit (GPU) separate from the one or more computing components;

generating, by the image processing system, one or more modified images of the one or more image frames, the one or more modified images including indications of detected objects depicted in the one or more image frames;

processing, by the image processing system, the one or more modified images to transform a perspective of the one or more modified images to a uniform view;

calculating, by the image processing system, distances between one or more pairs of objects detected in the one or more modified images, wherein calculating the distances between the one or more pairs of objects comprises:

calculating, for a pair of objects from the one or more pairs of objects, a first pixel distance between a first indication of a first object depicted in a modified image and a second indication of a second object depicted in the modified image;

calculating a second pixel distance between the first indication and the second indication;

modifying, using a ratio value, the first pixel distance to a first actual distance and the second pixel distance to a second actual distance; and calculating a distance between the first object and the second object based on the first actual distance and the second actual distance;

detecting, by the image processing system, one or more events based on one or more distances, from the distances, satisfying a threshold; and providing, by the image processing system, a user interface for display that indicates the one or more events detected based on the stream of image frames.

10. The method of claim 9, wherein the image processing system is associated with a decoupled cloud-based system architecture.

11. The method of claim 9, wherein detecting the one or more events comprises:

detecting a percentage of image frames, from the stream of image frames, over a time window that are associated with detected events; and detecting an event based on the percentage of the image frames satisfying an event threshold.

12. The method of claim 9, wherein processing the one or more modified images comprises:

obtaining, for a view of a camera of the one or more cameras, a set of transform reference points associated with transforming the view to the uniform view; and transforming modified images, from the one or more modified images, that are associated with the camera to the uniform view using the set of transform reference points.

13. The method of claim 9, wherein the uniform view is a top-down view.

14. The method of claim 9, wherein the first indication is a first bounding box indicating a first location of the first object as depicted in the modified image and the second indication is a second bounding box indicating a second location of the second object as depicted in the modified image.

15. The method of claim 9, further comprising:

obtaining actual measurement values of one or more static objects included in a view of a camera associated with the modified image;

calculating pixel measurement values of the one or more static objects as depicted in one or more images, from the stream of images, associated with the camera; and calculating the ratio value based on the actual measurement values and the pixel measurement values.

16. The method of claim 9, wherein the one or more objects include at least one of:

a person, a vehicle, a machine, or a device.

17. The method of claim 9, wherein the user interface includes information associated with events, including the one or more events, captured by all cameras included in the one or more cameras, and wherein the user interface includes an indication of a frequency of events over time for respective cameras included in the one or more cameras.

18. An apparatus, comprising:

means for obtaining a stream of images from a set of cameras;

means for obtaining, by an inferencing component, one or more image frames included in the stream of image frames, wherein the inferencing component comprising one or more computing components;

means for detecting, by a graphics processing component, one or more objects depicted in the one or more images, wherein the graphics processing unit comprises a graphics processing unit (GPU) separate from the one or more computing components;

means for inserting bounding boxes indicating detected objects depicted in the one or more images;

means for transforming a view of the one or more images to a uniform perspective;

means for calculating distances between two or more objects depicted in the one or more images, the distances being based on pixel distances between respective bounding boxes associated with the two or more objects, wherein the means for calculating the distances between the two or more of objects comprises:

means for calculating, for a pair of objects from the two or more objects, a first pixel distance between a first indication of a first object depicted in a modified image and a second indication of a second object depicted in the modified image;

means for calculating a second pixel distance between the first indication and the second indication;

means for modifying, using a ratio value, the first pixel distance to a first actual distance and the second pixel distance to a second actual distance; and means for calculating a distance between the first object and the second object based on the first actual distance and the second actual distance;

means for detecting an event based on one or more distances, from the distances, satisfying a threshold; and means for providing a user interface for display that indicates information associated with the event.

19. The apparatus of claim 18, further comprising:

means for providing a report indicating the information associated with the event, wherein the information includes at least one of:

an indication of a camera, from the set of cameras, that captured image data used to detect the event, a time associated with the event, a date associated with the event, a location associated with the event, or a duration of the event.

20. The apparatus of claim 18, wherein the means for calculating the distances between two or more objects depicted in the one or more images comprises:

means for converting the pixel distances between the respective bounding boxes associated with the two or more objects using a ratio value that is based on a measurement of a reference object included in the one or more images.

21. The apparatus of claim 18, wherein the user interface includes a color scale indicating a frequency of events, including the events, associated with respective cameras, from the set of cameras, over time.

22. The apparatus of claim 18, wherein the user interface includes an indication of a frequency of events, including the event, over time and with respect to locations corresponding to respective cameras from the set of cameras.

23. The apparatus of claim 18, wherein the means for detecting the one or more objects includes an artificial intelligence object detection model.

24. The apparatus of claim 18, wherein the means for detecting the event comprise:

means for detecting a percentage of image frames, from the stream of image frames, over a time window that are associated with detected events; and means for detecting an event based on the percentage of the image frames satisfying an event threshold.

25. The apparatus of claim 18, wherein the uniform perspective is a top-down view.

* * * * *